B. F. FLEGEL & L. S. DARLING.
PIPE BOWL CLEANER.
APPLICATION FILED OCT. 28, 1912.

1,227,601.

Patented May 29, 1917.

WITNESSES
Arthur F Miller.
Katherine Holt

INVENTORS.
Benjamin F. Flegel & Louis S. Darling
By Morsell & Caldwell
ATTORNEYS.

UNITED STATES PATENT OFFICE.

BENJAMIN F. FLEGEL, OF RACINE, WISCONSIN, AND LOUIS S. DARLING, OF ELLINGTON, CONNECTICUT.

PIPE-BOWL CLEANER.

1,227,601.  Specification of Letters Patent.  Patented May 29, 1917.

Application filed October 28, 1912. Serial No. 728,041.

*To all whom it may concern:*

Be it known that we, BENJAMIN F. FLEGEL and LOUIS S. DARLING, citizens of the United States, and residents, respectively, of Racine, Racine county, Wisconsin, and Ellington, Tolland county, Connecticut, have invented new and useful Improvements in Pipe-Bowl Cleaners, of which the following is a description, reference being had to the accompanying drawings, which are a part of this specification.

Our invention has relation to improvements in pipe bowl cleaners.

The object of the invention is to provide a simple, inexpensive and thoroughly efficient device for cleaning bowls of smoking pipes from the accumulations or coatings which necessarily form upon and adhere to the interior of the bowl, and which coatings or accumulations, unless frequently removed, will entirely fill the bowl and affect very materially the flavor as well as the aroma of the tobacco.

With the above primary object in view, the invention consists of the improved construction herein shown and described, or the equivalent thereof.

Figure 1:
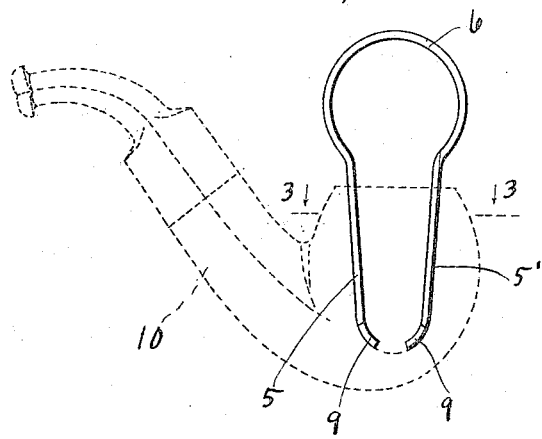
Figure 1 shows our improved pipe bowl cleaner within the bowl of a pipe, in the position in which it is applied when in the act of cleaning, the pipe being shown in dotted lines.
Figure 2:
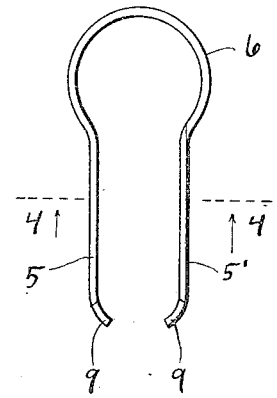
Fig. 2 is a detail view of the cleaner.
Figure 3:
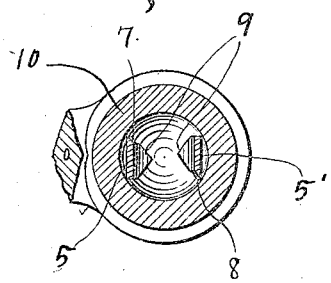
Fig. 3 is a horizontal section on the line 3—3 of Fig. 1, the pipe being shown in full lines.
Figure 4:
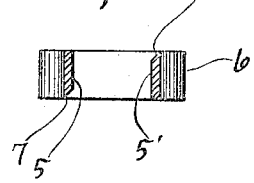
Fig. 4 is a cross section on the line 4—4 of Fig. 2 looking in the direction of the arrows.

The improved device consists of two pendant scraping blades or members 5 and 5', and a connecting upper handle portion 6, preferably formed integral with the scraping blades. The device is advisably made of spring or resilient metal so as to adapt the scraping members to readily adapt themselves to the interior conformation of the bowls of different pipes.

Each scraping member has preferably one or both of its edges beveled to form approximately knife edges, so that when the scraping members are revolved within the bowl of a pipe, these knife edges will take onto the interior wall of the bowl and cut or scrape away the adhering matter.

In the drawing each scraping member is shown as having one edge beveled, the bevel of member 5 being indicated by the numeral 7, and the bevel of member 5' by the numeral 8. It is obvious that as the device is turned within the pipe bowl, the cutting edge of the member in advance will act upon the adhering coating, and then the oppositely disposed cutting edge of the other member will follow and similarly act upon the adhering coating. We desire it understood, of course, that instead of each scraping member having only one of its edges beveled both scraping members may have both edges beveled, or that only one scraping member be provided with a bevel at either one of its edges or bevels at both edges, and that such changes from the specific arrangement shown in the drawing are to be considered within the spirit and scope of our invention.

As is well known, the bowls of pipes usually taper downwardly to the bottom of the bowl, so that said bottom or lower end of the bowl is of reduced area. We, therefore, prefer to form the extremities of the scraping members of conical shape, or, in other words, form said lower extremities so that the edges thereof taper to a point, as indicated by the numeral 9. By this provision, when the device is inserted into the pipe bowl, the lower extremities of the scraping members will conform to and fit the bottom of the bowl.

The upper handle 6 of the cleaner may be of any desirable form, but is preferably made of the enlarged rounded loop form shown in the drawing.

Fig. 1 of the drawing illustrates in dotted lines an ordinary form of smoking pipe, indicated by the numeral 10. In the use of the cleaner, the scraping blades or members are inserted into the pipe bowl, the springy nature of the metal of which the device is preferably made permitting the said scraping blades to readily adjust themselves to the contour of the interior of the bowl. The handle is then grasped and the cleaner turned. This turning, as will be obvious, has the effect of causing the device to quickly and thoroughly cut out and remove the adhering coating, which invariably accumulates upon the inside of the bowl.

It will be evident from the foregoing description that the construction is exceedingly simple and inexpensive in character, as well as efficient in use.

As a matter of preference in construction, the device will be made of tool steel, with the scraping blades hardened, and the bowed handle spring tempered.

What we claim is:

A pipe bowl cleaner, comprising a loop-shaped handle, a pair of cutting members spaced apart and straight in cross section projecting therefrom in approximately parallel planes so that they are substantially parallel both transversely and longitudinally, the said handle and cutting members being formed of a single strip of spring metal of substantially the same width throughout except at the ends of the cutting members which are tapered and bent inwardly, the said cutting members being adapted to be sprung toward each other to fit within a pipe bowl with their edges engaging the walls of the pipe bowl the full length of said pipe bowl and being held firmly thereagainst by the spring pressure of the loop-shaped handle portion and adapted to be turned within the pipe bowl by means of the handle portion and having their forward edges beveled on the inner faces thereof, whereby they form parallel knives with their cutting edges diametrically opposite for planing or reaming the interior of the pipe bowl.

In testimony whereof, we affix our signatures, in presence of witnesses.

BENJAMIN F. FLEGEL.
LOUIS S. DARLING.

Witnesses:
C. H. KEENEY,
E. B. FUNSTON,
WM. A. KUHNLY,
JOHN J. O'NEIL.

Copies of this patent may be obtained for five cents each, by addressing the "Commissioner of Patents, Washington, D. C."